H. F. HAGEMEYER.
VIAL MACHINE.
APPLICATION FILED MAY 25, 1914.
1,335,733.
Patented Apr. 6, 1920.
6 SHEETS—SHEET 5.
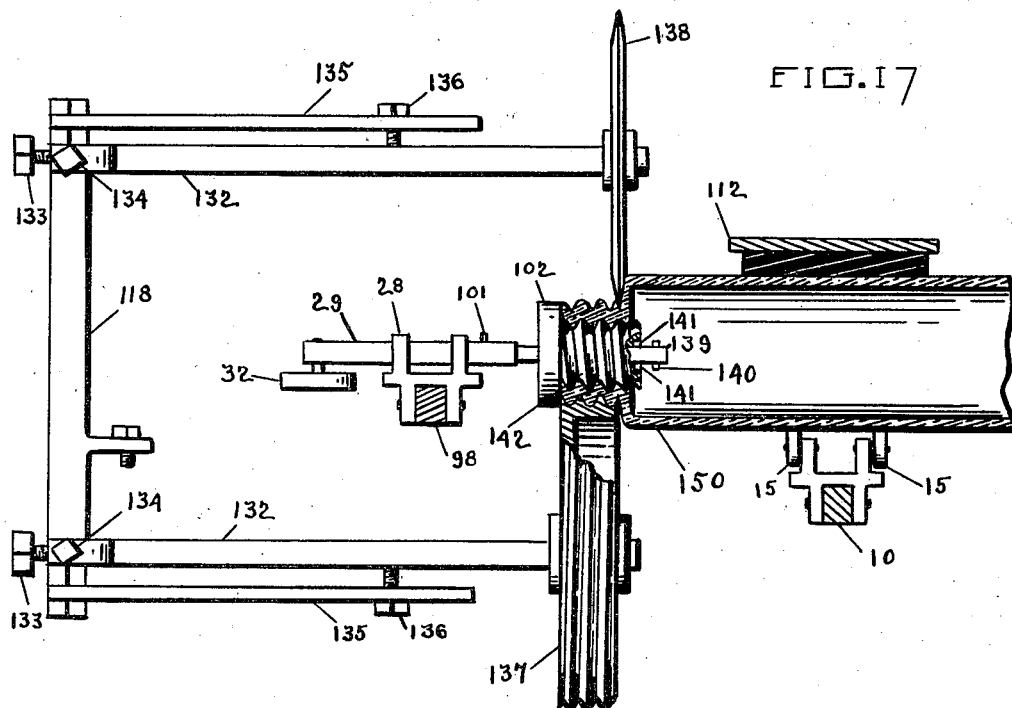
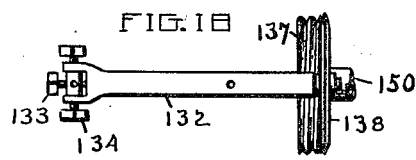
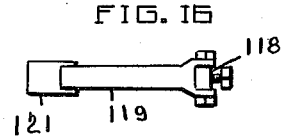
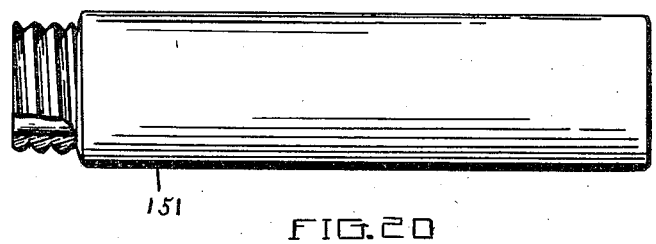
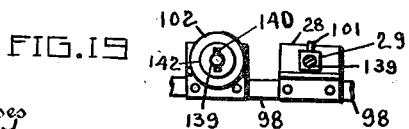
Henry F Hagemeyer Inventor

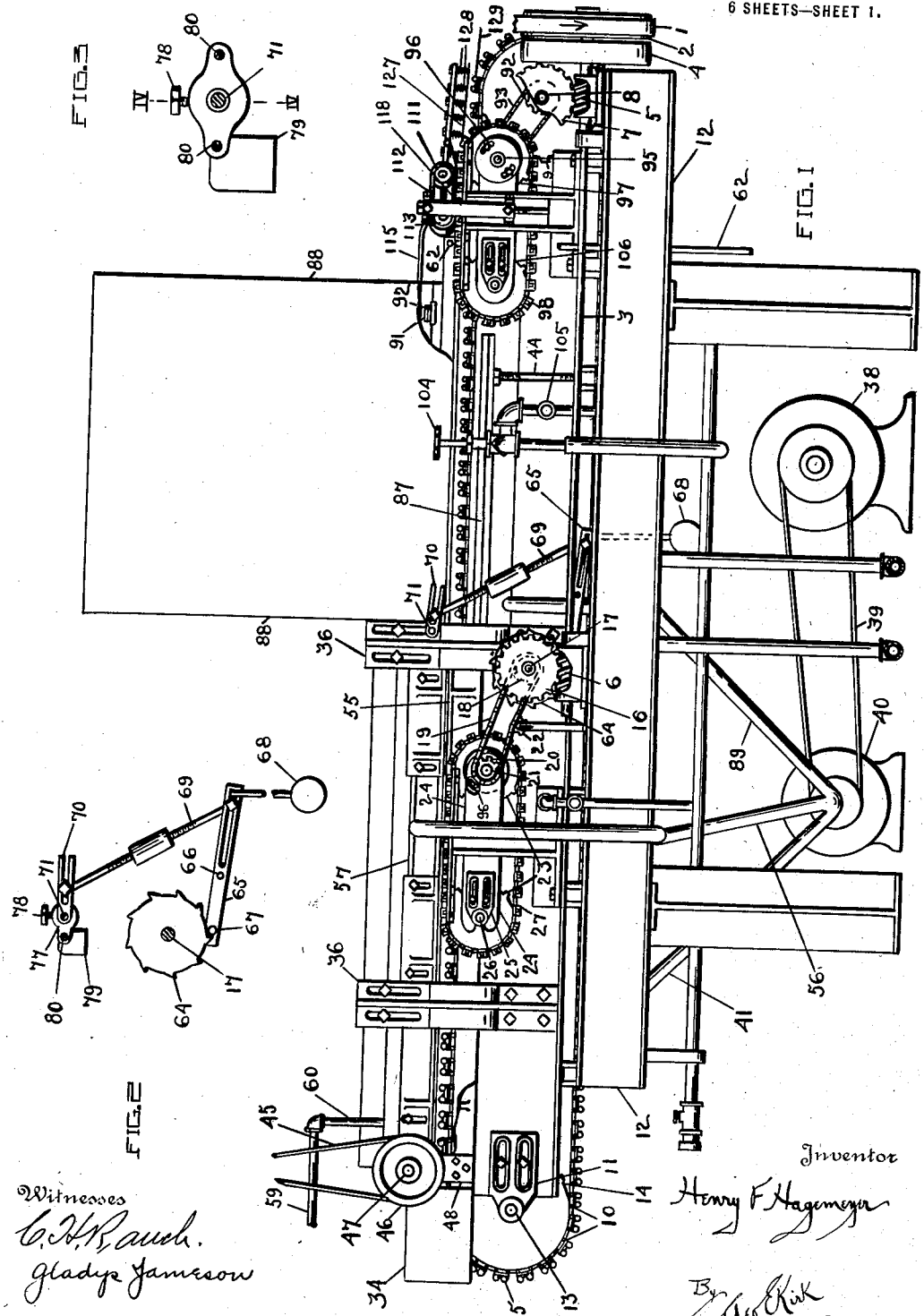

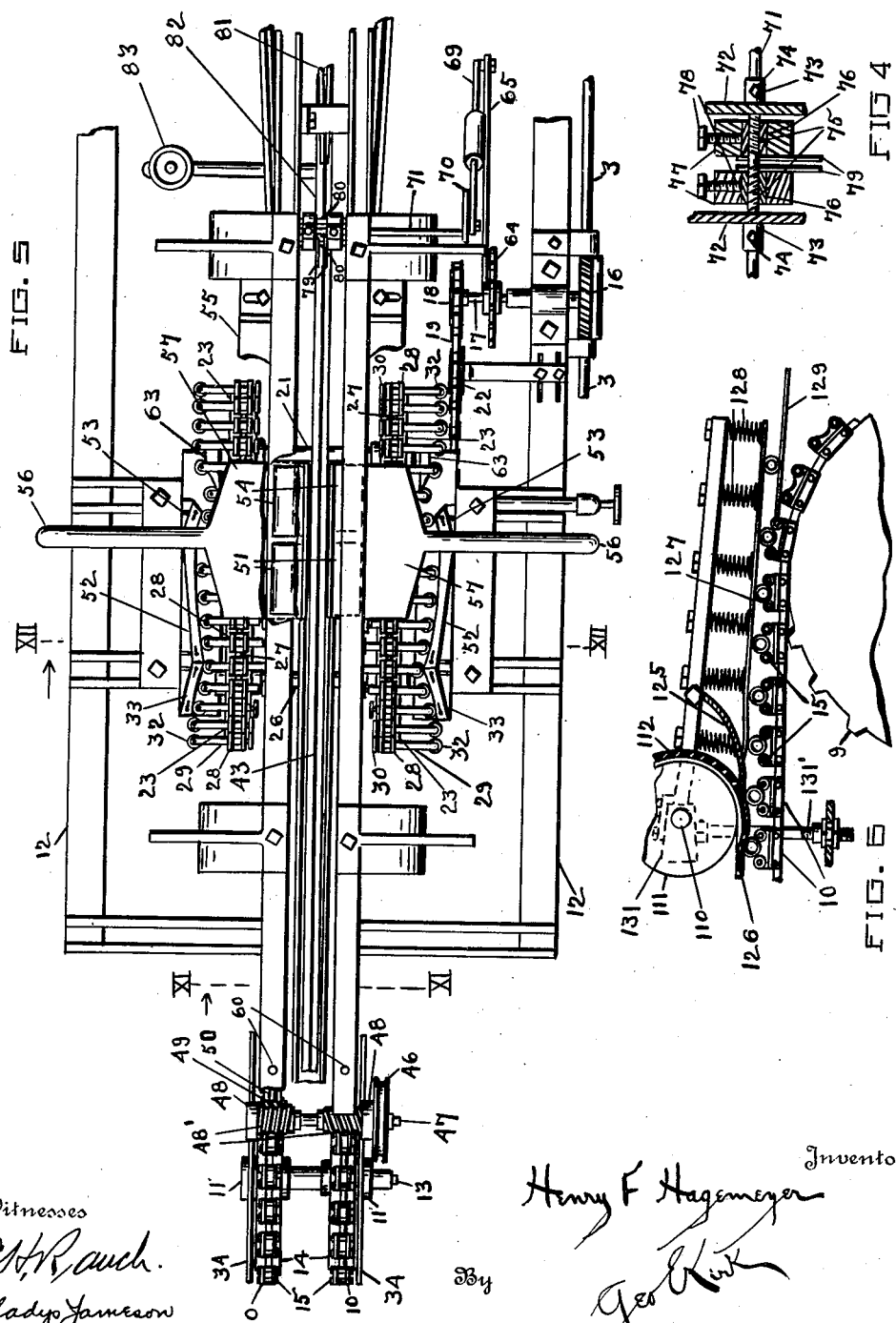

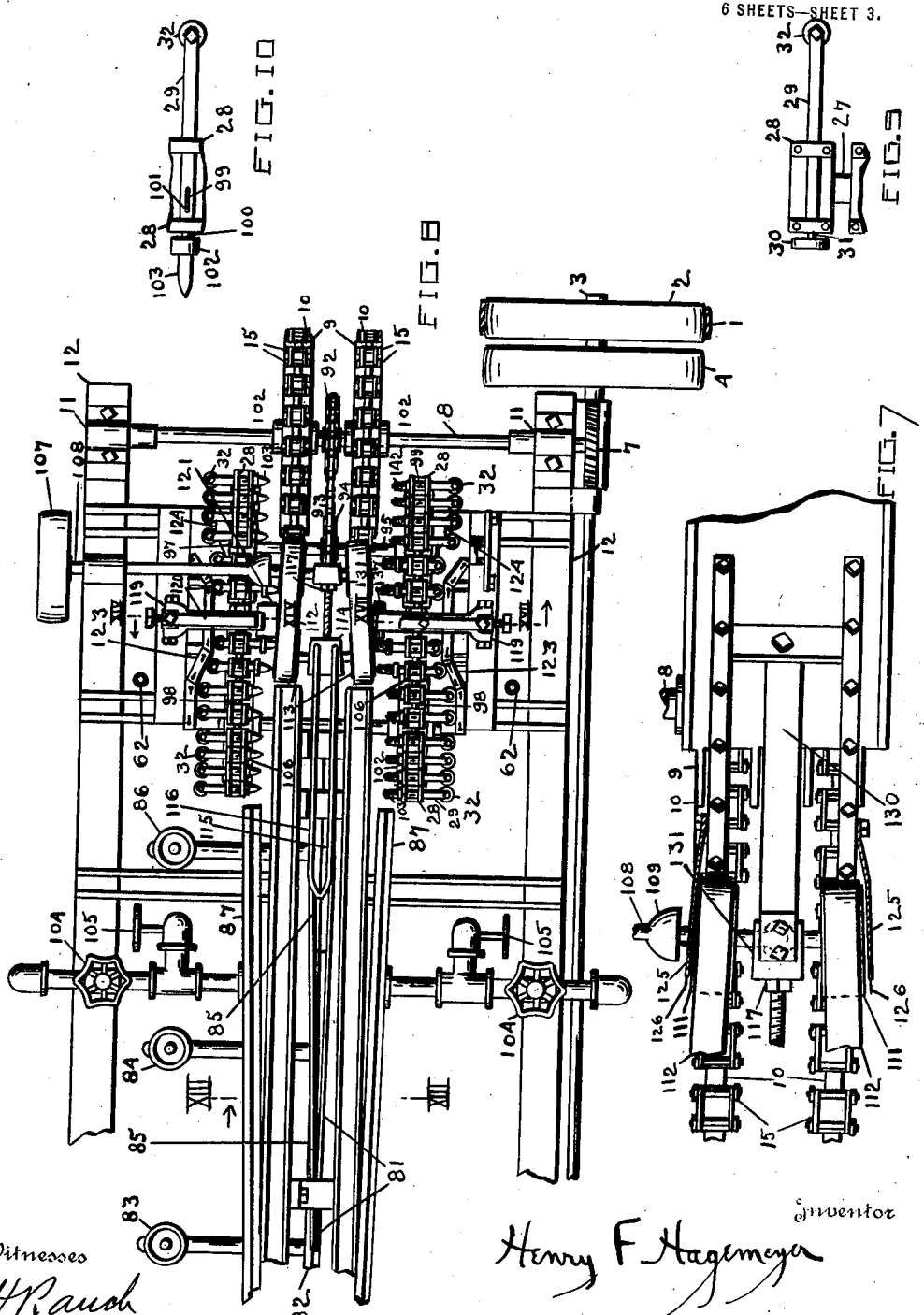

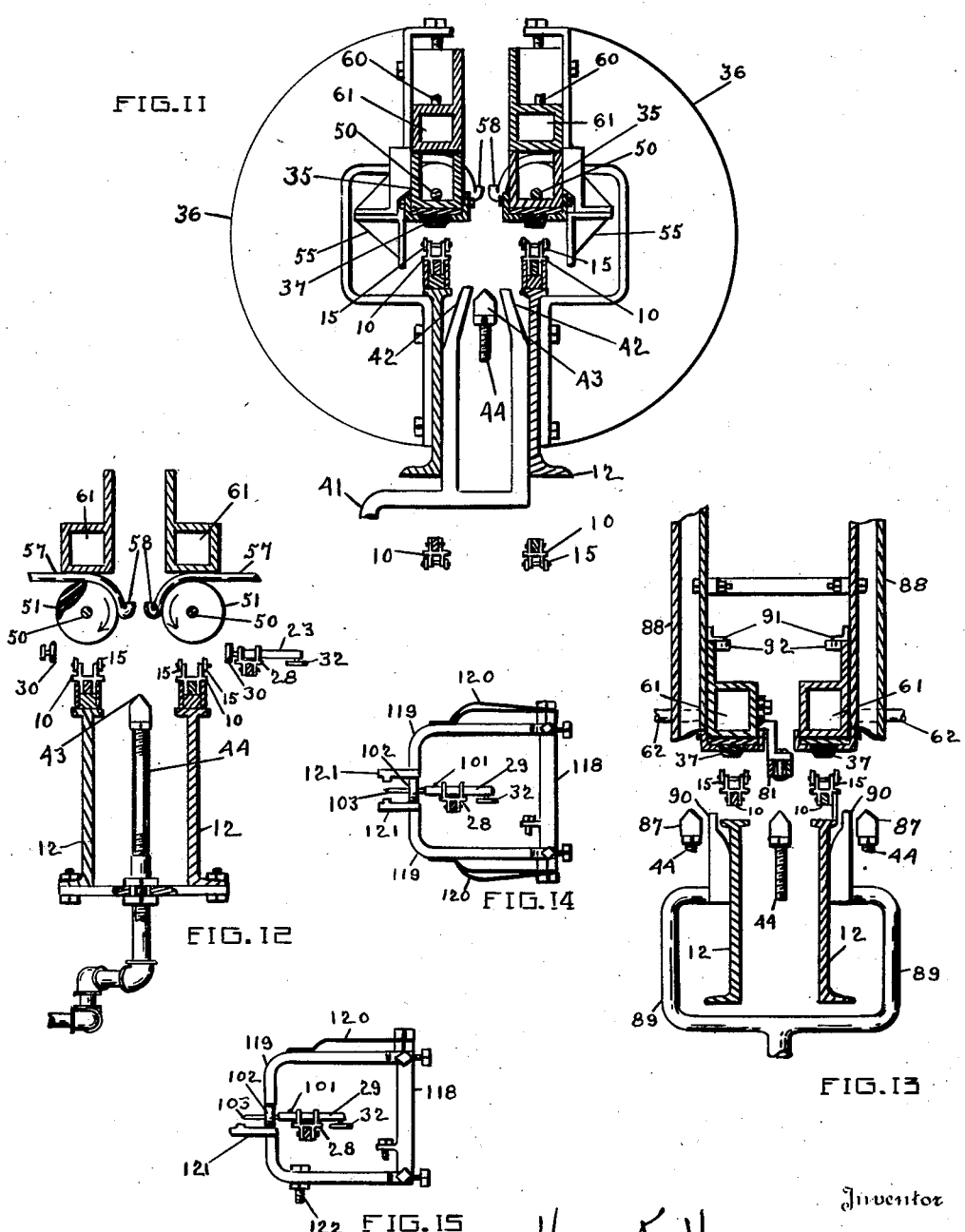

H. F. HAGEMEYER.
VIAL MACHINE.
APPLICATION FILED MAY 25, 1914.

1,335,733.

Patented Apr. 6, 1920.
6 SHEETS—SHEET 6.

Witnesses
Gladys Jamison
C. H. Rauch

Inventor
Henry F. Hagemeyer
By Geo. E. Kirk
Attorney

UNITED STATES PATENT OFFICE.

HENRY F. HAGEMEYER, OF TOLEDO, OHIO, ASSIGNOR, BY MESNE ASSIGNMENTS, TO JOHN N. WILLYS, OF TOLEDO, OHIO.

VIAL-MACHINE.

1,335,733.    Specification of Letters Patent.    Patented Apr. 6, 1920.

Application filed May 25, 1914. Serial No. 840,707.

*To all whom it may concern:*

Be it known that I, HENRY F. HAGEMEYER, a citizen of the United States of America, residing at Toledo, Lucas county, Ohio, have invented new and useful Vial-Machines, of which the following is a specification.

This invention relates to handling heated ware, especially in connection with forming plastic material.

This invention has utility when embodied in glassware forming machines in the manufacture of vessels as bottles and vials, being especially adapted to form various bottom closures and top formations therefor.

Referring to the drawings:

Figure 1 is a side elevation with parts broken away of an embodiment of the invention;

Fig. 2 is a fragmentary detail of the bottom forming or flattening device;

Fig. 3 is a side elevation of one of the elements of the bottoming device;

Fig. 4 is a section through the pair of bottoming device elements on the line IV—IV, Fig. 3;

Fig. 5 is a plan view of a portion of the machine at the left in Fig. 1;

Fig. 6 is an enlarged fragmentary detail in side elevation of the take off device near the right extremity of the machine of Fig. 1;

Fig. 7 is a plan view of the take off device of Fig. 6;

Fig. 8 is a plan view of a portion of the machine at the right in Fig. 1; Figs. 5 and 8 forming a plan view of the machine of Fig. 1;

Fig. 9 is a detail of one of the end guides for controlling the transverse travel of the ware adjacent the severing device shown centrally of Fig. 5;

Fig. 10 is a view of one of the centering elements for the ware during the top forming shown centrally of Fig. 8;

Fig. 11 is a section on the line XI—XI Fig. 5, looking in the direction of the arrow;

Fig. 12 is a partial section on the line XII—XII, Fig. 5, looking in the direction of the arrow;

Fig. 13 is a section on the line XIII—XIII Fig. 8, looking in the direction of the arrow;

Fig. 14 is a side elevation of the neck former on the line XIV—XIV Fig. 8, showing upper and lower non-rotating neck formers and each yieldable;

Fig. 15 shows a detail view in side elevation of a rigid neck former element and a yieldably held centering element coacting therewith;

Fig. 16 is a plan view of one of the neck former holders;

Fig. 17 is a section on the line XVII—XVII Fig. 8, looking in the direction of the arrow, showing rotating neck formers;

Fig. 18 is a fragmentary plan view of one of the holders for the rotating formers;

Fig. 19 is a fragmentary side elevation of the inside neck former;

Fig. 20 is a side elevation of an article produced by the formers of Fig. 17, being a screw top vial;

Figure 21:
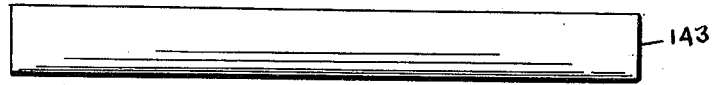
Fig. 21 is a side elevation of a tube section or blank as received in the machine.

The machine may be continuously driven by the belt 1, shown in Fig. 1 as on the loose pulley 2 carried by the shaft 3. When this driving belt 1 is shifted to the fast pulley 4, the shaft 3 is driven to actuate the worms 5, 6. The worm 5 drives the worm wheel 7 on the shaft 8 (Figs. 1 and 8). Fast on the shaft 8 are the sprocket wheels 9 over which pass the sprocket chains or conveyers 10. The shaft 8 is mounted in the bearings 11 carried by the main frame 12.

At the remote end of the frame 12 from the shaft 8 are bearings 11' carrying the shaft 13 upon which is mounted the sprocket wheels 14 over which pass the sprocket chains 10 having the roller flights 15 forming anti-friction ware holders. The bearings or brackets 11' are adjustable to take up slack in the chains 10.

The worm 6 drives the worm wheel 16 on the shaft 17 (Figs. 1 and 5) which has the sprocket wheel 18 thereon driving sprocket chain 19 extending over the sprocket wheel 20 fast on the shaft 21. The slack in this sprocket chain is taken up by the adjustable idler 22. This shaft 21 carries sprocket wheels 23. The shaft 21 is mounted in the bearings 24 carried by the frame 12. The bearings 24 also carry adjustable bearing brackets 25 for the shaft 26 carrying a pair of sprocket wheels 23 similar to the pair of sprocket wheels 23 on the shaft 21. Over these sprocket wheels pass the sprocket chains 27 embodying the guide blocks 28 (Figs. 5, 9) through each of which is reciprocable a rectangular nonrotatable element 29 having roller 30 mounted on the pin 31 extending into the element 29 from the inner end of said element so that said roller 30 may freely rotate, as by contacting the end of a rotating blank, thereby taking retarding friction off said blank when the face of the roller 30 is moved thereagainst by the action of the member 29 through its guiding roller 32 coacting with the cams 33. The cams 33 first move the disks 30 into contacting relation with the ends say of a rotating blank.

In the manufacture of vials, a cylindrical tubular section of glass may be put between the guide plates 34 (Figs. 1, 5) to rest in an anti-friction holder 15 on each of the conveyers 10 to be carried by said conveyers under the bars 35 (Fig. 11) which are adjustable in the brackets 36 and carry the yieldable contacting member or soft rubber 37 directly opposing the anti-friction holders 15 of the conveyers or sprocket chains 10. As the sprocket chains travel the blank or ware contacting the rubber or stationary pressure bar 37 is caused to rotate. Adjustment up and down of the elements carried by the brackets 36 cares for different diameter tubing for vials, while adjustment of the longitudinal beams of the frame 12 toward or from each other permits length variation in vials.

The motor 38, (Fig. 1) through its belt 39 drives the fan 40 having duct 41 leading therefrom (Figs. 1, 5, 11) to the fluid discharge means 42 which have upwardly opening outlet slots parallel with the machine way or line of travel of the ware. Between these air discharging passages is mounted the burner 43 having a discharge slot upwardly directed and parallel with the slots 42. The bolt 44 through the slotted plates adjustably mounts the burner 43 as to the machine frame 12 so that vertical or lateral adjustment may be had (Fig. 12).

This action of the burner on the blank serves to heat the blank and this heating or production of hot ware is maintained local to the portion directly above the burner 43 by the action of the air blast 42 directed upward. The air on each side of the heated portion thereby provides a cooling blanket on each side of the jet, protecting the moving parts of the holders 15 and conveyers 10 as well as the rubber contacting members 37.

As the blank becomes heated centrally, in order to avoid thickening, the blank may be elongated by moving the sections transversely of their line of travel as to the way in the machine. This is accomplished by the driving belt 45 driving the pulley 46 on the shaft 47 mounted in the adjustable bearings 48 carried by the frame 12. The shaft 47 (Figs. 1, 5) has the oppositely disposed spiral gears 48' coacting with the spiral pinions 49 on the shafts 50. These shafts 50 (Figs. 5, 11, 12) carry the ware contacting rollers 51 which may also be of yielding material to better engage the ware, such material in the disclosure being rubber. These rollers 51 rotate positively with the under portions moving out as shown in Fig. 12 so that in contacting the ware or blank such blanks are thrust against the disks 30 when the rollers 32 of the elements 29 bear against the adjustable cam portions 52 and thereby gradually elongate the weakened central portion of the blank to assist in reshaping or severing as said cam sections are adjusted to the desired pre-determined extent. The rollers 32 are then urged inwardly by the adjustable cam portions 53 (Fig. 5), which inward travel is permitted by the idle rollers 54 similar to the live rollers 51. As the blanks pass the rollers 51, 54, they rotate on their own axes as well as have transverse actuation. Upon leaving the rollers 54 the blanks again are rotated by the pressure bar or contacting members 37 and abut adjustable end guides 55 to determine their position.

The sheet air jets or fluid discharge means 42 extend to the region of the rollers 51, 54. To provide a means for counteracting any heating of these rollers as well as deterioration of the rubber thereof, the duct 56 from the fan 40 conveys fluid to the roller jacketing members 57 (Figs. 1, 5, 12) which jacketing members 57 provide passages for a continuous current of cooling air closely adjacent a side of the rollers. These jacketing members 57 have fluid discharge openings 58 upwardly directed, one on each side of the plane of the burner, which serve as current inciting means not only to confine the heat of the burner but quickly remove such heat from the machine by upward current directly above the burner.

To contribute to the ease in preventing heat deterioration or overheating of the moving parts of the mechanism, for the ware or machine parts adjacent said ware, fluid circulating passages are provided, there being a water supply line 59 having ducts 60 (Figs. 1, 11) in communication with the fluid passages 61 adjustably supported with the bars 37 by the brackets 36 and extending parallel with the way or line of travel of the conveyers. Outlet duct 62 (Fig. 1) serves to carry away the heated water and thus complete the circulation of the liquid through the machine.

The cams 63 (Fig. 5) serve to withdraw the members 29 so that they are in position to be acted upon by the cams 33 when they complete their circuit of continuous travel in synchronism with the holders 15, there being a disk 30 directly registering with each of said holders in its travel past the cams 33, 52, 53, 63.

This drawing apart of the blanks during the continued heating thereof effects a separation of the blank into two sections, and a rounding off or flowing of said separated sections to a closed end form.

In the production of bottles or vials it is desirable that the closed end or bottom be shaped flat in many instances. To care for this positively a bottoming device is introduced. Fast on the shaft 17 is the toothed wheel 64 (Figs. 1, 2, 5) timed to have its teeth in synchronism with the ware holders 15. The lever 65 mounted on the fulcrum 66 has pin 67 riding on the teeth of the wheel 64 to rock said lever against the counterweight 68 and thereby through the adjustable link 69 coacting with the arm 70 rock the shaft 71 (Figs. 2, 3, 4). This shaft 71 is maintained against lateral movement as to its bearings 72 by the collars 73 held by the set screws 74. Intermediate these bearings 72 the shaft 71 has right and left threaded portions 75 upon which are mounted the bushings 76 and as to which the yokes 77 are held by the set screws 78. These yokes 77 carry the formers, bottoming paddles or plates 79 and the yokes are held from rotation by the pins 80 extending therethrough parallel with the shaft 71. As the shaft 71 is rocked by the lever 65 from the wheel 64, the plates or paddles 79 simultaneously move apart and then quickly return to their central or closed position. This quick separation movement is timed to occur just as the blank sections with the plastic bottoms are in position as to the bottoming elements 79 and there accordingly results in the outward movement a gentle pat of short duration which forces the closed end of each blank section into a plane insuring a flat bottom for each article.

The severed and completely bottomed blank sections now contact at their inner ends the central adjustable dividing member or tongue 81 (Figs. 5, 13) which is heated by the burner 82 as controlled by the valve 83. The heating of this tongue 81 is graduated to permit a uniform cooling of the formed bottom of the vial. The valve 84 may regulate the burner 85 as to the burner 82 while the valve 86 may regulate the next burner section 85 for still less heating than the burners 85 and 82 (Fig. 8).

This tongue member 81 gradually works the blank sections away from each other and during this travel the outer ends are heated by the long narrow burners 87 mounted on adjusting bolts 44. This warming or reheating relieves local strains in the formed bottom. These burners 87 have their exhaust taken up by the flues 88 thereover and the heating action of these burners may be confined to the outer end portion and kept away from the holder thereby supplementing the cooling action of the liquid circulating passage 61. Further, the fluid duct 89 conveys air from the fan 40 to the fluid discharging means 90 parallel with the conveyers 10 as an additional feature for localizing the heating action. The burners 87 may accordingly diverge to allow for the transverse travel of the blank sections as produced by the central bottoming member guide or tongue 81. The flues 88 are removably mounted upon the machine by the angle tongue 91 engaging in the brackets 92 (Fig. 13).

Fast on the shaft 8 (Figs. 1, 8) is the sprocket wheel 92 having the sprocket chain 93 driving the sprocket wheel 94 fast on the shaft 95. By the slotted adjusting element 96 (Fig. 1) the sprocket wheels 97 may be adjusted to carry the sprocket chains 98 (Fig. 10) having guide blocks 28 for the reciprocable members 29 carrying the transverse actuating rollers 32. The inward recessed end of the member 29 carries the spring 99 against which the bearing stem 100 is held by the pin 101 so that the collar 102 (Fig. 10) and the centering element 103 are non-rotatably held by the non-rotatable element 29.

The heated outer ends of the blanks passing the burners 87 are brought to a plastic state as the burners are adjusted by the valves 104, 105, and the sprocket chains 98 passing over the sprocket wheels 106, 97, bring in synchronism the centering element 103 for each holder 15 so that each article of ware may have the centering element 103 properly lined up therewith and hold such article during the lip or neck forming operation. The adjusting element 96 permits this proper positioning of the centering means 103 as to the holders, as does the similar adjusting element 96 of the sprocket wheels 23 to their shaft 20 for alining the relatively rotatable disks 30 as to the holders 15.

The driving pulley 107 (Fig. 8) serves to drive the shaft 108 having the universal connection 109 (Fig. 7) with the shaft 110 connected to actuate the pulleys 111 carrying the belts 112 passing over the pulleys 113 (Fig. 8) having the bearing block 114 provided with the liquid chamber to which extends the water supply duct 115 and from which extends the water exhaust 116. The adjusting nut 117 serves to take up tension of the belts 112. These belts have a yieldable facing as a contacting member, say of rubber. These belts are driven in the direction of ware travel so that the ware is readily brought thereunder when it approaches the belts and the speed is such that for this short duration of time a high rotative velocity is given the ware and this rotative velocity occurs while the centering means 103 is in active position as also during the neck or neck and lip forming operation.

Mounted in the frame 12 adjacent the pulley 113 is the bracket 118 carrying the upper member 119 yieldably held by the springs 120 to carry the upper neck former 121 (Fig. 14) as a non-traveling member, while the centering element 103 may pass therebelow inserted in the blank. Opposing this upper neck forming member 121 may be a similar lower neck forming member 121 also held yieldably in position by spring 120 acting upon the lower hinged member 119. The device of Fig. 15 shows the spring 120 yieldably holding the hinged member 119 against the collar 102 of the centering blade or element 103 while the actual neck forming is accomplished by the single lower neck forming element 121 rigidly held in the hinged member 120 by the bolt 122, in definite adjusted position and stationary while the traveling ware passes along.

The centering elements are controlled by the adjustable cams 123 timed to coact with the rollers 32 to insert the bladed centering elements 103 in the blanks as the blanks approach the high speed rotating device or belts 112. These centering elements are withdrawn by the positively directing cam sections 124 so that the reciprocable elements 29 are in position for a repetition of this centering travel in their next movement into alinement with the ware holder 15.

With the ware thus completed and having just been released from the high rotative speed, the take off device becomes effective. This device (Figs. 1, 6, 7) embodies a coil 125 upon a flexible stem 126 and extends adjacent the rollers 111 to yieldingly engage the completed vials by opposing the holders 15.

The vials in passing along under the spiral 125 are delivered thereby to the flexible tape 127 yieldingly held thereagainst by the springs 128 to pass the completed ware to the chute 129. The extension 130 from the bearing 131 carrying the pulleys 111 holds this take off device in position. The position of these belts 112 may be adjusted by the nuts 117 and by the bearing supporting bolts 131'.

In the lip forming device of Figs. 14, 15, there is relative rotation between the blank being reformed and the exterior forming or shaping element as well as the interior forming or shaping element. In some instances it is desirable to produce a form which is not the form of simple revolution. A usual type thereof is a screw neck construction in the production of which threading the exterior forming element coacts with the blank without relative movement.

A bracket 118 (Figs. 17, 18) has hinged thereto the members 132 with the set screws 133 engaging therewith to maintain the members 132 in parallel relation notwithstanding they are mounted on the pivot pins 134. To preclude any outward swing of these members 132 the supplemental arms 135 are provided and their set screws 136 may be adjusted to nicely regulate the outward limit for the members 132. The lower member 132 carries the threaded follower roller 137 which in being contacted by the plastic end of the rapidly rotating ware forms thereon a threaded extension. For threading the roller is shown with such form therein. Opposing this roller 137 is a second follower roller 138 simultaneously driven. The narrow edge of this roller 138 extends to the root of the threads formed by the roller 137 at the shoulder end thereof and definitely shapes the shoulder so that it may receive a gasket, if desired. This roller 138 may be wider to define a neck or neck and lip when the outer threading is omitted. The action of the collar 102 is such that the outer end of the threaded portion of the article is in a plane. With such an article a screw cap may effect sealing by a packing either at the shoulder or in the cap.

Supplementing this closure structure of exterior threading, there may be an interior threading. Instead of the bar 29 carrying the blade element 103, there is the stem 139 (Figs. 17, 19) having the pins 140 therethrough, so that when the cam 123 thrusts the bar 29 into the plastic end of the ware, this pin 140 is unseated from the transverse slot or recess 141 in the spool 142, thereby released for free rotation as to the pin 140, and the elements are in the position shown in Fig. 17. Action of the cam 124 in bringing the pin 140 into the recess 141 at once keys the externally threaded spool 142 and insures its immediate expulsion by the rotation of the newly formed interior thread pressed thereon by the outside roller after the spool has entered the plastic end of the ware. Each carrier may coact with an article of ware in each of its cycles of travel thereby continuously producing articles with great rapidity and of uniform character.

Figure 22:
Fig. 22 shows the blank after being medially heated and elongated at such heated portion.
Figure 23:
Fig. 23 shows the severed blank sections.
Figure 24:
Fig. 24 shows the severed blank sections after flowing to form in rounding off the closed ends.
Figure 25:
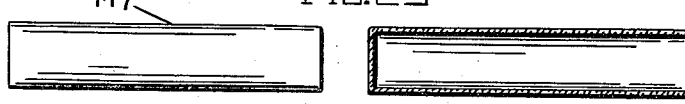
Fig. 25 shows the closed inner ends of the blank sections after having been acted upon by the bottomer of the flattener type to form the vial bottoms.
Figure 26:
Fig. 26 shows the blank sections with their outer ends flowed inwardly and thickened by heating.
Figure 27:
Fig. 27 shows the completed vials after action upon the sections of Fig. 26 by the neck former mechanism in the machine as disclosed one side being equipped to form screw neck vials and the other side equipped to form the ordinary lip vial.

In the operation of the machine a length of tube of the desired dimension is placed between the relatively adjustable plates 34 the distance apart of which may be varied by the setting of the brackets in the main frame 12. This blank 143 (Fig. 21) is heated and elongated to produce the blank 144 (Fig. 22) which is the form of the blank as handled by the transverse actuating rollers 51. At this step the heating of the elongated blank 144 results in the production of the blank sections 145 (Fig. 23) which blank sections have the pointed closed inner ends. Continued heating of these ends by drawing them in closer to the burner 43, as effective by the cams 53, flows these inner ends to a more abrupt or approximately flattened portion, as shown in the blank sections 146, (Fig. 24). This flattening is completed by the bottoming device blades 79, producing the blank sections 147 (Fig. 25). While the formed bottom is being gradually cooled by the member 81, which is also transversely actuating the blanks as to the way, or moving them outward, there is a heating of the outer ends of said blanks by the burners 87 to produce the blank sections 148 (Fig. 26). These blank sections which have been rotated up to this point solely by the opposing contacting member, as pressure bar 37 or transverse actuating rollers 51, are now speeded up by the belts 112, as the non-rotating centering blade 103 or stem 140 with the spool 142 enter such plastic ends and the collars 102 abut said ends. These care for the forming of the neck insides and the ends of the vial opposing the bottom. Simultaneously with this action, the fixed or non-traveling neck former 121 of short longitudinal extent and upon one side only of the blank completes the groove or neck to finish the vial 149 (Fig. 27) or the rollers 137, 138 form the screw threaded neck of the vial 150 or 151 (Figs. 20, 27). The completed vial is then delivered to the take off device of Figs. 6 and 7.

The interior thread of vial 150 will permit of double sealing. The interior screw threads may engage a usual form of yieldable stopper of rubber or cork by twisting therein. This effects a secure sealing by elimination of all packing or gasket elements and direct removal without untwisting cannot occur. With the stopper in place a screw cap with packing disk in the top or to abut a gasket at the vessel shoulder may be used. With the neck former 121 for the outside there may be the threaded inside neck vessel or a similar lip-neck may be formed by configuring the outer forming roller 137 or 138 accordingly instead of straight as shown by the vial 152 (Fig. 27). The interior threaded article permits of a simple and most efficient sealing.

The various devices and mechanisms incorporated herein are relatively adjustable permitting the handling by this machine of blanks of different diameter and different length as well as of varying thicknesses, making possible with a single machine considerable range of utility in the production of ware of different characters and sizes as well as different types of necks therefor. Furthermore, a large output of uniform ware of a superior character may be easily produced with but a single attendant for several machines.

What is claimed and it is desired to secure by Letters Patent is:

1. In a machine of the class described, the combination of a conveyer; means for driving said conveyer; means for mounting a plurality of cylindrical blanks on said conveyer; and a pair of oppositely driven rollers extending longitudinally of the conveyer and adapted to contact with said blanks to force the ends thereof in opposite direction.

2. In a machine of the class described, the combination of a conveyer; means for driving said conveyer; means for mounting a plurality of cylindrical blanks on said conveyer; means disposed to heat the central portions of said blanks; a pair of oppositely driven rolls extending longitudinally of the conveyer and disposed to contact with said blanks on opposite sides of said heating means, and adapted to effect an endwise movement of the ends of said blanks in opposite directions; and means for limiting the endwise movement of said blanks.

3. In a machine of the class described, the combination of a conveyer; means for driving said conveyer; means for rotatably mounting a plurality of cylindrical blanks on said conveyer; means disposed to heat the central portions of said blanks; means for effecting endwise movement of the ends of said blanks in opposite directions; a pair of chains moving in synchronism with said conveyer; a plurality of members carried by said chains and movable longitudinally; a disk rotatably carried by one end of each of said members and adapted to engage an end of each of said blanks; and means for limiting the endwise movement of said members.

4. In a machine of the class described, the combination of a conveyer; means for driving said conveyer; means for mounting a plurality of cylindrical blanks upon said conveyer; means for heating the central portions of said blanks; means for dividing said blanks into two sections; means for bottoming the adjacent ends of said blanks; a longitudinally extending dividing member having diverging sides disposed between the adjacent ends of said sections for separating the same when severed; and heating means disposed to subject the said dividing member to a graduated heat.

5. In a machine of the class described, the combination of a conveyer; means for driving said conveyer; means for mounting a plurality of cylindrical blanks on said conveyer; means for heating the central portions of said blanks; means for dividing each of said blanks into two sections; a diverging dividing member disposed between the adjacent ends of said sections for separating the same after they are severed; and heating means disposed to subject said dividing member to a graduated heat.

6. In a machine of the class described, the combination of a conveyer; means for driving said conveyer; means for mounting a plurality of cylindrical blanks on said conveyer; means disposed to heat the central portions of said blanks; means for dividing each of said blanks into two sections; a dividing member having divergently arranged sides disposed between the adjacent ends of said sections to separate them after they are severed; diverging burners disposed to heat the outer ends of said sections; and forming means acting on said outer ends.

7. In a machine of the class described, the combination of a conveyer; means for driving said conveyer; means for mounting a plurality of cylindrical blanks upon said conveyer; means disposed to heat the central portions of said blanks; means for dividing each of said blanks into two sections; a dividing member having divergently arranged sides for separating said sections after they are severed; diverging burners disposed to heat the ends of said sections; centering means moving in synchronism with said conveyer and automatically moving into engagement with the outer ends of each section; means for imparting axial rotation to said sections; and neckforming means acting upon the outer ends of each of said sections.

In witness whereof I affix my signature in the presence of two witnesses.

HENRY F. HAGEMEYER.

Witnesses:
G. P. MacNichol,
C. H. Rauch.